(12) United States Patent
Deitz et al.

(10) Patent No.: US 8,583,536 B1
(45) Date of Patent: Nov. 12, 2013

(54) SYSTEM AND METHOD FOR REDUCING THE RISKS INVOLVED IN TRADING MULTIPLE SPREAD TRADING STRATEGIES

(75) Inventors: Alexander D. Deitz, Chicago, IL (US); Sagy P. Mintz, Lincolnshire, IL (US); David W. Garrison, Arlington Heights, IL (US)

(73) Assignee: Trading Technologies International, Inc., Chicago, IL (US)

( * ) Notice: Subject to any disclaimer, the term of this patent is extended or adjusted under 35 U.S.C. 154(b) by 807 days.

(21) Appl. No.: 11/840,553

(22) Filed: Aug. 17, 2007

(51) Int. Cl.
*G06Q 40/00* (2012.01)

(52) U.S. Cl.
USPC .............................. 705/37; 705/35

(58) Field of Classification Search
CPC ................................ G06Q 40/04; G06Q 40/00
USPC ............................................... 705/37, 35
See application file for complete search history.

(56) References Cited

U.S. PATENT DOCUMENTS

| | | | |
|---|---|---|---|
| 7,437,325 B2 | 10/2008 | Kemp, II et al. | |
| 7,542,940 B2 * | 6/2009 | Burns et al. | 705/37 |
| 7,617,149 B2 * | 11/2009 | Rosenthal et al. | 705/37 |
| 7,644,030 B2 * | 1/2010 | Burns et al. | 705/37 |
| 7,672,896 B2 * | 3/2010 | Burns et al. | 705/37 |
| 7,813,995 B2 * | 10/2010 | Burns et al. | 705/37 |
| 8,019,673 B1 * | 9/2011 | Rooney | 705/37 |
| 2002/0052827 A1 * | 5/2002 | Waelbroeck et al. | 705/37 |
| 2003/0130929 A1 * | 7/2003 | Waddell | 705/37 |
| 2003/0200167 A1 * | 10/2003 | Kemp et al. | 705/37 |
| 2004/0093300 A1 * | 5/2004 | Burns | 705/37 |
| 2004/0193526 A1 * | 9/2004 | Singer et al. | 705/37 |
| 2006/0015436 A1 * | 1/2006 | Burns et al. | 705/37 |
| 2007/0112665 A1 * | 5/2007 | Mackey et al. | 705/37 |
| 2007/0168275 A1 * | 7/2007 | Busby et al. | 705/37 |

FOREIGN PATENT DOCUMENTS

WO       WO-03/077061       * 9/2003

OTHER PUBLICATIONS

McComas: "Getting technical with spreads, Futures" Chicago, Jul. 2003. vol. 32, Iss. 9; p. 52.*
Unpublished U.S. Appl. No. 11/240,684, filed Sep. 30, 2005, entitled "System and Method for Use of Fractional Pay-Up Ticks in Relation to Trading Strategies in and Electronic Trading Environment".

* cited by examiner

*Primary Examiner* — Eric T Wong
*Assistant Examiner* — Edward Baird
(74) *Attorney, Agent, or Firm* — McDonnell Boehnen Hulbert & Berghoff LLP (57) ABSTRACT

System and methods for reducing the risks involved in trading multiple spread trading strategies in an electronic trading environment are provided. Specifically, reducing the risks involved in trading multiple spreads that share a leg by, among other things, quoting a single order in the shared leg instead of quoting orders for each of the corresponding spread legs. Based on the computed quote price for the single order, associating the single order with the leaned on price that results in the price closest to the inside market in the shared leg. The single quote order is based on the market conditions in the spread legs and the desired spread price. Once the single order fills, a hedge order is sent to the leg that obtains the most advantageous price for the spread based on the other spread options.

24 Claims, 9 Drawing Sheets

SYSTEM AND METHOD FOR REDUCING THE RISKS INVOLVED IN TRADING MULTIPLE SPREAD TRADING STRATEGIES

FIELD OF INVENTION

The present invention is directed to electronic trading. More specifically, the present invention is directed toward reducing risks involved in trading multiple spread trading strategies in an electronic trading environment.

BACKGROUND

Electronic trading refers to a trading system that matches orders by an electronic trading platform. Current examples of electronic trading platforms include the Chicago Mercantile Exchange ("CME") Globex® trading system, the Chicago Board of Trade ("CBOT") e-cbot, and Eurex, just to name a few. A trading system that matches orders electronically is also referred to herein as an "electronic exchange." Exchanges like the CME and CBOT currently offer trading via open outcry in addition to electronic trading.

With respect to electronic exchanges, traders connect to an electronic trading platform by way of a communication link through their client devices. Once connected, traders select which tradeable objects they wish to trade. As used herein, the term "tradeable object" refers to anything that can be traded with a quantity and/or a price. It includes, but is not limited to, traded events, goods and/or financial products such as stocks, options, bonds, futures, currency, and warrants, as well as funds, derivatives and collections of the foregoing, and all types of commodities, such as grains, energy, and metals. The tradeable object may be "real," such as products that are listed by an exchange, or "synthetic," such as a combination of real products that is created by the user. A tradeable object could actually be a combination of other tradeable objects, such as a class of tradeable objects.

Sometimes, on their machines, traders use automated or semi-automated trading tools, collectively hereinafter referred to as automated tools that automatically or semi-automatically send orders to the exchange. Such trading tools are usually provided, among other things, to facilitate fast and accurate order entry. For instance, an automated tool might quickly calculate one or more order parameters, such as an order price or order quantity, based on market conditions or some other reference condition, and then automatically send an order with these parameters to an exchange for matching. According to many existing and popular exchanges today, orders are electronically entered in an exchange order book in the sequence in which they are entered into the market (a first-in, first-out, commonly referred to as FIFO matching system). Based on this sequence and the availability of market quantity, orders are filled with priority given to the first order entered, then the second (next) order entered, and so forth. Different variations of FIFO or different matching systems altogether can be used as well.

In addition to trading individual tradeable objects, many traders often implement trading strategies that involve simultaneous trading of two or more tradeable objects. One such trading strategy is commonly referred to as spread trading. In general, spread trading is the buying and/or selling of one, two, or more tradeable objects, one purpose of which is to capitalize on changes or movements in the relationships between the tradeable objects. The tradeable objects that are used to complete a spread are referred to as the outright markets or legs of the spread. A spread trade could involve buying tradeable objects, buying and selling tradeable objects, selling tradeable objects or some combination thereof.

A commercially available trading tool that facilitates the automatic trading of spreads is Autospreader™ from Trading Technologies International, Inc. of Chicago, Ill. Once the legs of the spread are chosen and the relationship between them are defined, a user can input a desired spread price and quantity, and the Autospreader™ will automatically work orders in the legs to achieve the desired spread (or attempt to achieve the spread). The Autospreader™ is currently an add-on tool available with X_TRADER® Pro™, which is a trading application also available from Trading Technologies International, Inc.

U.S. patent application Ser. No. 10/137,979, entitled, "System and Method for Performing Automatic Spread Trading," filed on May 3, 2002, the contents of which are fully incorporated by reference herein, describes an automated spread trading tool. An example also is provided herein to illustrate how an automated spread trading tool like that described in the above incorporated application might work.

Using an automated trading tool such as Autospreader™, a trader can input a price to buy or sell the spread, and the automated trading tool will automatically work orders in the legs to achieve, or attempt to achieve the trader's desired price for the spread. For instance, a trader might define buying a spread as buying in leg A and selling in leg B. According to that definition, if the trader inputs a desired price to buy the spread, the automated trading tool will place a buy order in leg A, based on the best price that a sell order could be filled at in leg B. The best price in leg B is also known as the price that the buy order in leg A is based on. However, that price is determined based on the quantity available at that price, which is commonly referred to as the "leaned on" quantity. The instant that the order in leg A is filled, the automated trading tool submits an offsetting hedge order to leg B at the price calculated based on the parameters the trader entered during the spread set up.

As the market in leg B moves, the order in leg A may be re-priced to achieve the desired spread price. Re-pricing an order typically involves canceling the existing order and replacing it with a new order at another price. While effective for achieving a desired spread price, re-pricing can result in the new order being placed at the end of an order queue corresponding to the order's new price at the electronic exchange. If, the new order loses queue position, then it may decrease the likelihood that the order will get filled, or increase the likelihood that the trader will get "legged up," and as a result the trading strategy will fail. Additionally, one or more transaction fees are often charged by the electronic exchange for re-pricing the order.

Often times, traders are interested in trading multiple spreads that share a common leg at the same time. For example, a trader may be interested in spreading the 5 year bonds against the 2 year bonds, 10 year bonds, and 30 year bonds. According to conventional trading systems, a quote order associated with the 2, 10, and 30 year bonds would be placed in the 5 year bond market, equating to 3 quote orders being placed in the 5 year bonds. If the trader does not have a preference about where the offsetting hedge order is sent, but is more concerned with getting the best price for the spread, then the conventional method not only increases the risk for the trader, but also the margin requirements, exchange related fees and the amount of quoting and re-quoting of orders.

It is beneficial to provide an automated or semi-automated trading tool that offers an improved method for reducing the risks involved in trading multiple spread trading strategies in an electronic trading environment.

SUMMARY

The embodiments described herein reduce the risks involved in trading multiple spread trading strategies in an electronic trading environment. Specifically, the embodiments reduce the risks involved in trading multiple spreads that share a leg by, among other things, quoting a single order in the shared leg instead of quoting orders for each of the corresponding spread legs. The embodiments manage the single order based on the market conditions in the spread legs. Once the single order fills, the embodiments send a hedge order to the leg that obtains the most advantageous price for the spread based on the other spread options. The embodiments can be put to advantageous use in situations where a trader is interested in buying or selling a certain tradeable object (e.g., most often the shared leg), and is willing to hedge the order into any one of several tradeable objects. As such, the embodiments allow a trader to trade the tradeable object for which there is particular interest while hedging the risk into multiple markets at the general cost of hedging the risk into one market.

According to an example embodiment, a quote price for a shared leg is computed for each of the multiple spreads. Of those computed quote prices, the computed quote price that is closest to the inside market, or any other price level such as the last traded price, in the shared leg is determined. The embodiment then quotes a single order at that computed quote price in the shared leg. The single order quoted in the shared leg coincides with the computed spread price that results in the price closest to the inside market in the shared leg, such that if the single order fills, a hedge order can be sent to the appropriate leg to complete the spread for the most advantageous price available.

According to another example embodiment, the single quote order is managed as the markets in the individual spread legs fluctuate, so that the quote order price reflects the best quote price in the shared leg given the possible spread options. The best quote price is often the price that is closest to the inside market in the shared leg. As such, the determination of the quote order price can be based on one leg at one time, but a different leg at a subsequent time, depending on what leg (of the possible legs) provides the best quote price in the shared leg. Thus, the quote order price can change, or the leg on which the quote order currently leans on could change. When the single quote order fills, a hedge order is sent to the appropriate leg that completes the spread for the most advantageous price available.

According to yet another embodiment, the offsetting hedge order is sent to the associated leg when the quote order is completely filled. In an alternative embodiment, the offsetting hedge order is sent to the associated leg when a defined threshold of the quote order quantity is partially filled. Specifically, based on a defined spread ratio, the offsetting hedge order is sent to the associated leg with either the same quantity as the quote order or a partial quantity. For example, if the spread ratio is set to 1:1, then as soon as "1" unit of the quote order quantity gets filled, an offsetting hedge order for a quantity of "1" is sent to the associated leg. If the spread ratio is set to 11:1, then as soon as "6" units of the quote order quantity gets filled, an offsetting hedge order for a quantity of "1" is sent to the associated leg. Whether or not the hedge order is sent on a complete fill or a partial one, it is preferable that the options are left to the user. However, it is possible to hard-code these options, versus offering them as user-configurable.

According to the example embodiments, two or more different spreads may result in the same quote price in the shared leg. In this instance, a trader may wish to designate, in advance, a certain spread with a higher precedence level. The precedence level for each individual spread may be user configurable and could be based on, for example, one spread trading more actively than another, or one spread trading more volume than another spread. Precedence levels can also be hard-coded.

The embodiments provide many advantages. Some of these advantages are described herein, and one of ordinary skill upon reading the specification would understand these and additional advantages. For instance, there is an increased likelihood that the quote order would fill, given that it is priced closest to the inside market, and that the trader will ultimately acquire the spread at a most desired spread price. By quoting a single order (or a fewer number of orders) versus quoting multiple orders (depending on the number of spreads), there is reduced exposure and risk that the trader may get "legged up." Additionally, managing a single quote that serves multiple spreads helps preserve the price level and order queue position of the single order, as well as reduces the number of quotes and re-quotes in the shared leg.

Other examples are provided herein. Modifications may also be made to the system and methods without departing from the spirit or scope of the invention. Additional features and advantages of the embodiments will be set forth in the description that follows. The features and advantages of the example embodiment may be realized and obtained through the embodiments particularly pointed out in the appended claims. These and other features will become more fully apparent from the following description, figures, and appended claims, or may be learned by the practice of the example embodiments as set forth hereinafter.

BRIEF DESCRIPTION OF THE DRAWINGS

Example embodiments are described herein with reference to the following drawings, in which:

FIG. 7 is a block diagram illustrating a trading screen that demonstrates an example method for adjusting the orders in the legs involved in the spread to reduce the risk associated with trading a spread trading strategy in an electronic trading environment.

DETAILED DESCRIPTION

I. A First Example Trading System

Figure 1:
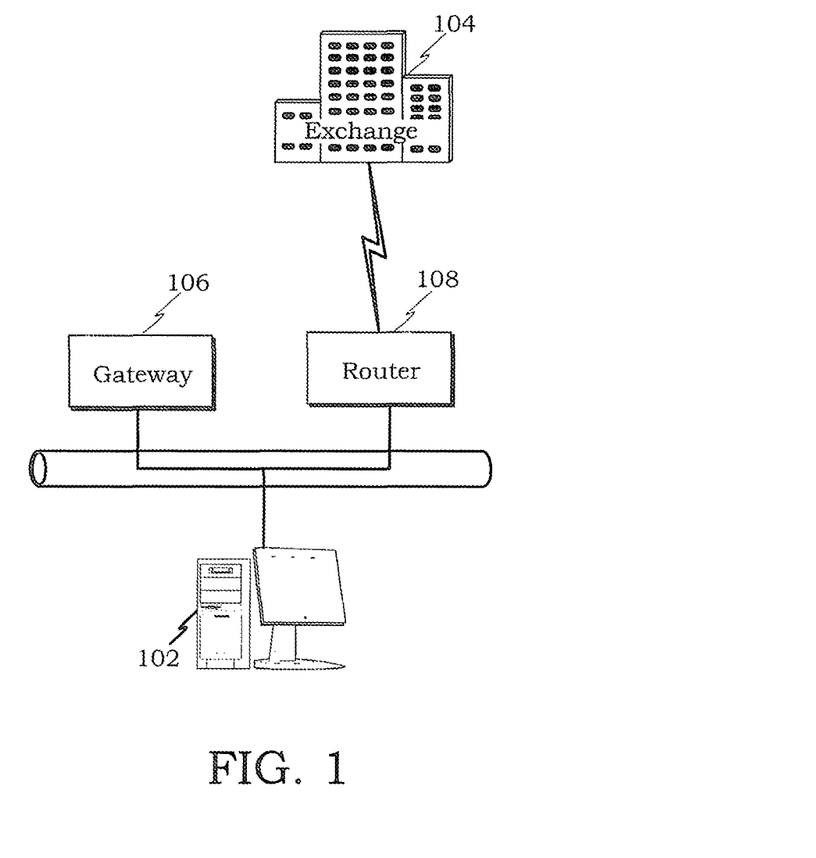
FIG. 1 illustrates an example electronic trading system for trading, wherein the trading system includes a trading station where a trader can submit bids and offers for a tradeable object being traded at an electronic exchange.

FIG. 1 illustrates an example electronic trading system in which the example embodiments may be employed. In this example, the trading system comprises a client device 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the client device 102 with orders from other client devices (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the types of order execution algorithms used, the electronic exchange 104 provides market information to the subscribing client device 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually, although not necessarily, provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchange 104 can offer other types of market information such as the last traded price (LTP), the last traded quantity (LTQ), and order fill information.

The computer employed as the client device 102 generally can range from a hand-held device, laptop, or personal computer to a larger computer such as a workstation with multiple multiprocessors. Generally, the client device 102 includes a monitor (or any other output device) and an input device, such as a keyboard, a trackball, and/or a two or three-button mouse to support click based trading, if so desired. One skilled in the art of computer systems will understand that the present example embodiments are not limited to any particular class or model of computer employed for the client device 102 and will be able to select an appropriate system.

The computer employed as the gateway 106 generally can range from a personal computer to a larger or faster computer.

Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a client device or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

In general, it should be understood that the devices described herein could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

It should also be noted that the client device 102 generally executes application programs resident at the client device 102 under the control of the operating system of the client device 102. Also, the gateway 106 executes application programs resident at the gateway 106 under the control of the operating system of the gateway 106. In other embodiments and as understood by a person skilled in the art, the function of the application programs at the client device 102 may be performed by the gateway 106, and likewise, the function of the application programs at the gateway 106 may be performed by the client device 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN. In yet another example illustration, the gateway may be housed at, or near, its corresponding electronic exchange. According to this instance, the client device may communicate with the gateway over a wide area network or through the use of a T1, T3, ISDN, or some other high speed connection.

Further, the gateway may be located remote from the client device and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

II. A Second Example Trading System

Figure 2:
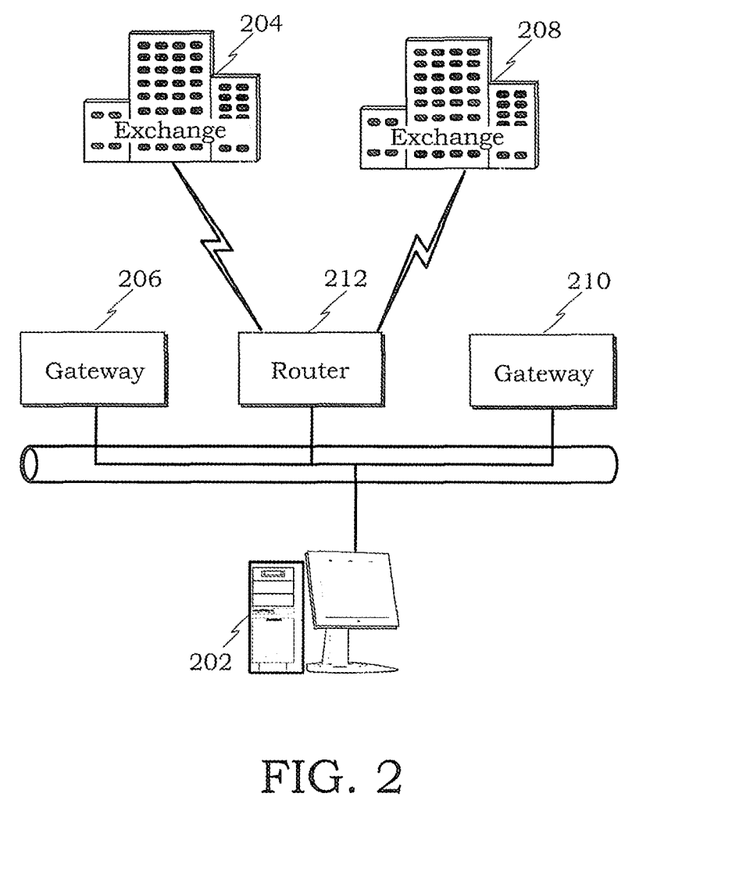
FIG. 2 illustrates another example electronic trading system for electronic trading, wherein this trading system includes a trading station where a trader can submit bids and offers for a tradeable object being traded at more than one electronic exchange.

FIG. 2 illustrates another example electronic trading system that uses similar computer elements as shown in FIG. 1, in which a trader may access and trade at multiple electronic exchanges. The system comprises a client device 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, client devices, routers, or other computers serving various functions like message handling and security). Additionally, several networks, like either of the networks shown in FIG. 1 or FIG. 2, may be linked together to communicatively access one or more electronic exchanges.

III. Client Device

Client devices 102 and 202 can be computers, such as a workstation, desktop, laptop, handheld device, and so forth, that allow a trader to trade one or more tradeable objects that are offered at exchange(s). A client device may include at least processor and memory. Preferably, the processor has enough processing power to handle and process various types of market information. The more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, a RAM, a PROM, an EPROM, a FLASH-EPROM, and any other memory chip or cartridge, or any other medium from which a computer can read.

When a client device receives market information or other data, such as news, or charting data, and order related information from an exchange, the received information may be displayed to the trader(s) on the visual output device or display device. However, it should be understood that the information could be provided to a trader using other means such as sound. The output device can be any display device. For example, the display could be a CRT-based video display, an LCD-based or a gas plasma-based flat-panel display, a display that shows three-dimensional images, or some other type of display.

Upon viewing the market information or a portion thereof, a trader may wish to send orders to an exchange, cancel orders, change orders, query an exchange, and so on. To do so, the trader may input various commands or signals into a client device such as by typing into a keyboard, inputting commands through a mouse, or inputting commands or signals through some other input device. For instance, a trader may click a mouse button to initiate an order to buy a particular quantity of the tradeable object at a particular price. Then, a client device preferably generates transaction information. There are many different types of messages and/or order types that can be submitted, all of which may be considered various types of transaction information. Once generated, transaction information is sent from a client device to one or more host exchanges over communication links.

In one example embodiment, a client device uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a client device could run automated types of trading applications.

IV. An Example Trading Station

Figure 3:
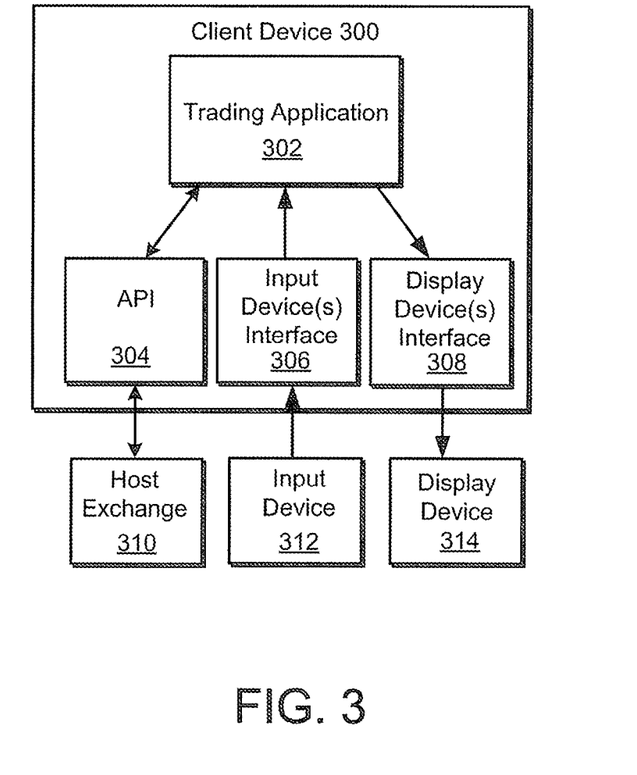
FIG. 3 illustrates an example trading station of either FIG. 1 or FIG. 2 where a user can submit bids and offers for a tradeable object being traded at one or more exchanges.

FIG. 3 illustrates an example trading station 300 which is similar to the type of trading stations 102 and 202 shown in FIGS. 1 and 2. Trading station 300 can be any particular type of computing device, examples of which were enumerated above. According to one example embodiment, trading station 300 has a trading application 302 stored in memory that when executed arranges and displays market information in many particular ways, usually depending on how the trader prefers to view the information. Trading application 302 may also implement an automated trading tool such as the automated spread trading tool that automatically sends orders into underlying legs to achieve a spread.

Preferably, trading application 302 has access to market information from one or more exchanges 310 through API 304 (or application programming interface), and trading application 302 can also forward transaction information to exchange 310 via API 304. Alternatively, API 304 could be distributed so that a portion of the API rests on the trading station 300 and a gateway, or at the exchange 310. Additionally, trading application 302 may receive signals from input device 312 via input device interface 306 and can be given the ability to send signals to display device 314 via display device interface 308.

Alternatively, the example embodiments described herein may be a separate program from trading application 302, but still stored in memory and executed on the trading station 300. In another alternative embodiment, the preferred embodiments may be a program stored in memory and executed on a device other than trading station 300. Example devices may include a gateway or some other well known intermediary device.

V. Automatic Spread Trading Overview

According to one embodiment of an automated spread trading tool, a trader can select two or more individual tradeable objects, to create a "synthetic spread" that is sometimes referred hereinafter interchangeably as a "spread". Each tradeable object may be referred to as a "leg" of the spread. The automatic spread trading tool preferably generates spread data based on information in the legs and based on spread setting parameters, which may be configurable by a user. The spread data may be communicated to a graphical user interface where it is displayed and where data corresponding to the legs of the spread may be displayed as well. At the client device, the user can enter orders in the spread window, and the automated spread trading tool will automatically work orders in the corresponding legs to achieve, or attempt to achieve (because the fill of the order is not always guaranteed) a desired spread.

Figure 4:
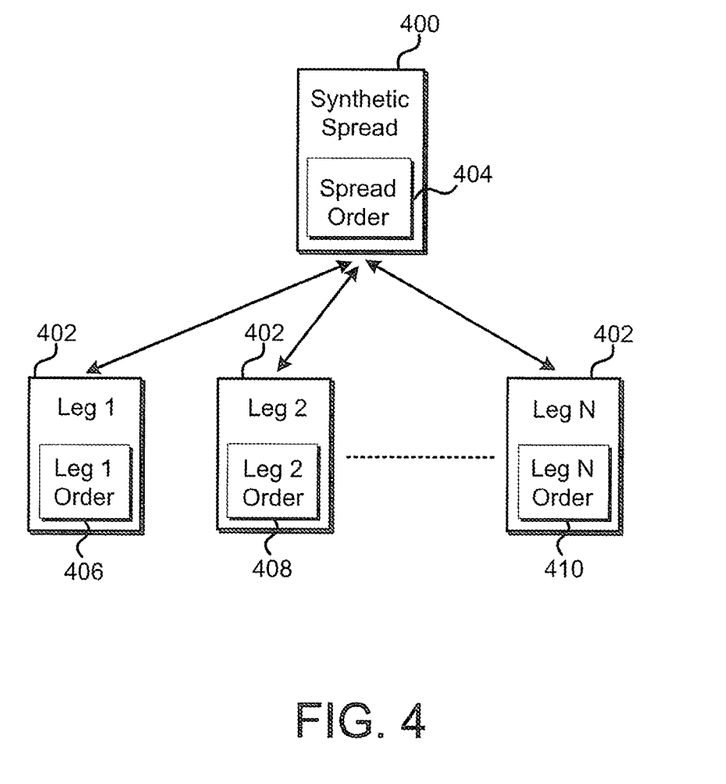
FIG. 4 is a block diagram illustrating an example relationship between a synthetically created spread and its underlying "N" number of legs.

FIG. 4 is a block diagram illustrating the relationship between a synthetically created spread 400, its underlying N legs 402, and a spread order 404 that has been entered. When a trader enters an order to buy or to sell the spread (e.g., represented as spread order 404) in a synthetic market, the automated spread trading tool automatically places orders in the appropriate legs to achieve or attempt to achieve the desired spread 404. For example, to achieve spread order 404, the automated spread trading tool may automatically enter orders 406, 408, 410 into the underlying legs 402. The automated spread trading tool may, among other things, calculate the quantities and prices for the orders 406, 408, 410 based on market conditions in the other legs and one or more parameters. It should be understood that an order to buy or sell the spread is simply an order price and an order quantity associated with the spread.

Using FIG. 4, let's assume that a spread order 404 has been entered into the market. When a trader enters an order to buy or to sell the spread (e.g., spread order 404) in a synthetic market, the automated spread trading tool automatically places orders in the appropriate legs to achieve or attempt to achieve the desired spread 404. For example, to achieve synthetic spread order 404, the automated spread trading tool may automatically enter orders 406, 408, . . . 410 into the underlying legs 402 (e.g., "Leg 1," "Leg 2," . . . "Leg N"). The automated spread trading tool may, among other things, calculate the quantities and prices for the orders 406, 408, 410 based on market conditions in the other legs and one or more parameters.

For example, according to one trading strategy, consider if "Leg 1 Order" 406 is a buy order, then the price of order 406 may be based on the leaned on price of "Leg 2" and on the leaned on price of each leg through "Leg N." In other words, the price of order 406 leans on the quantity at the corresponding price level in "Leg 2" though "Leg N." Of course, depending on the trading strategy, the price of order 406 might be based only on some of the legs and not on all N legs. Alternatively, other trading strategies may be used to determine the price and quantities of the orders. Of course, the order parameters of an order in one leg can lean on other types of market conditions in the other legs such as the last traded price (LTP), the last traded quantity (LTQ), a theoretical value, multiple quantities such as quantities closer to the inside market, or some other reference point.

When the leg orders are generated by the automated spread trading tool, they may be routed to one or more exchanges, depending on where the tradeable objects defined for the spread are traded. If the orders are not filled right away when they are received at the exchange(s), the orders are placed in order queues corresponding to the prices of each leg order.

VI. Reducing the Risks Involved in Trading Multiple Spreads with a Shared Leg

Figure 5A:
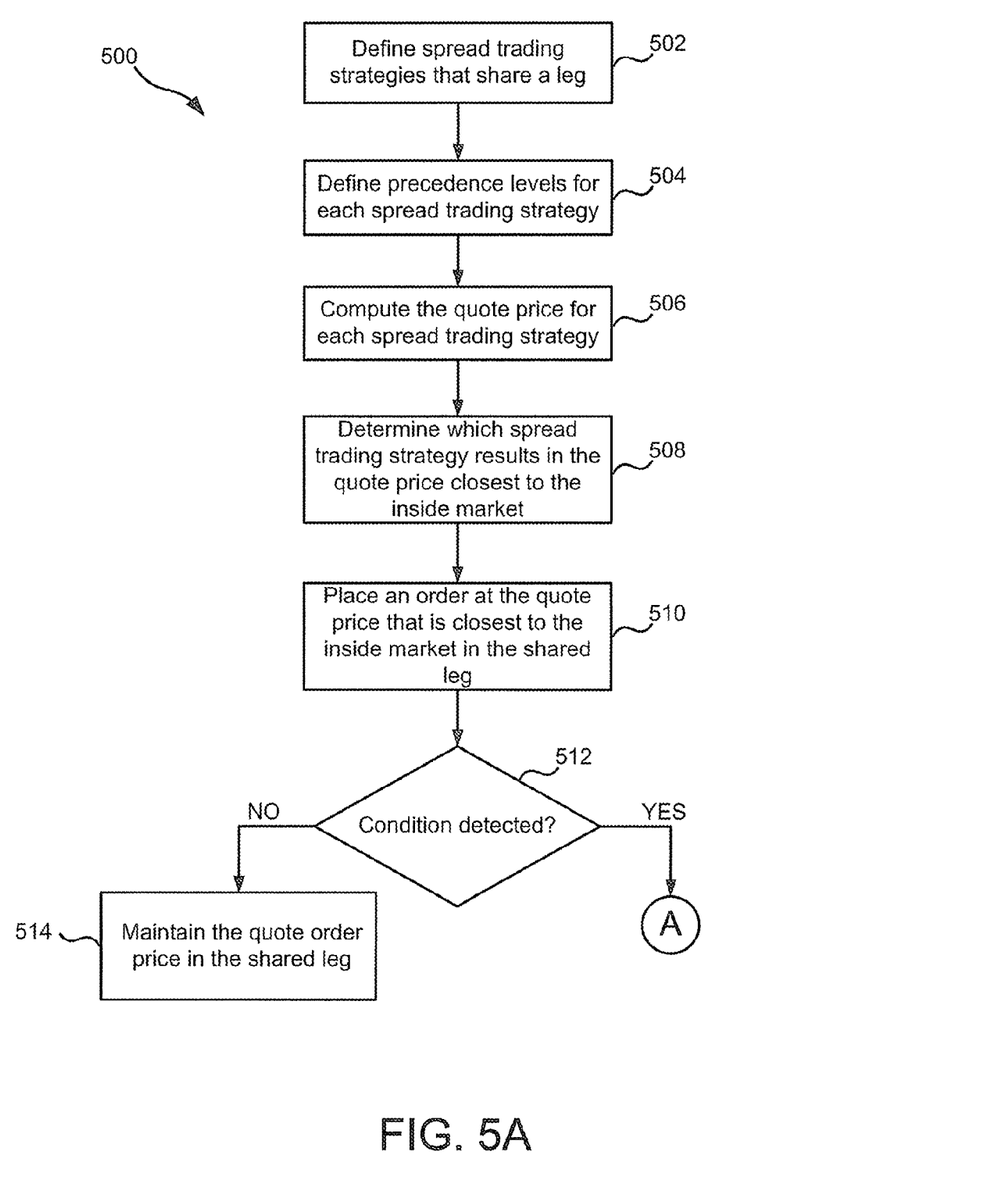
FIG. 5A is a flow chart illustrating an example method for reducing the risk involved in trading a spread trading strategy in an electronic trading environment.
Figure 5B:
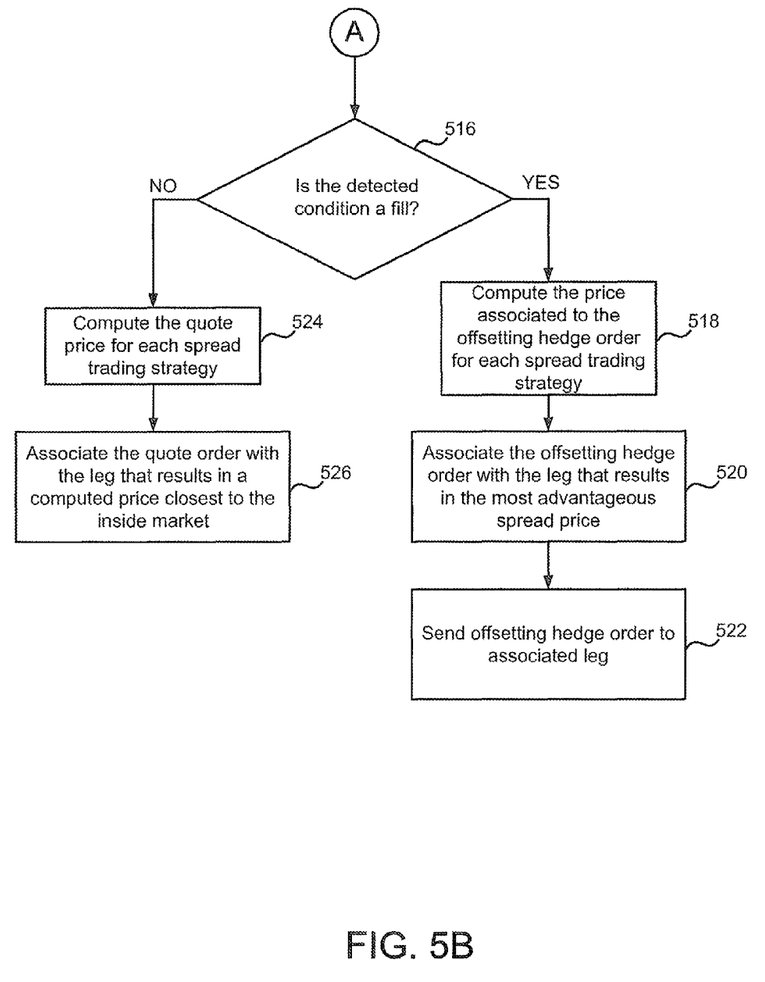
FIG. 5B is a continuation of the flow chart from FIG. 5A, illustrating the example method for reducing the risk involved in trading a spread trading strategy in an electronic trading environment.

FIG. 5 is a flow chart illustrating an example method for reducing the risk associated with trading multiple spread trading strategies in an electronic trading environment. It should be understood that the flow chart only shows the functionality and operation of a possible implementation of the example method. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At step 502, the trader defines one or more spread trading strategies that contain multiple legs and share a common leg. The trader may not be as concerned with which of the legs the offsetting hedge order is sent to, but instead concerned with achieving the most advantageous price for the spread, given the options available to the trader.

At step 504, the trader defines precedence levels in advance for each individual spread leg. The defined precedence level determines which leg the offsetting hedge order should be sent to when at least two spreads result in the same quote order closest to the inside market. For example, let's assume a trader has defined Leg B to have a higher precedence due to the amount of trading volume that takes place in the Leg B market. If Leg A is the shared leg, then when the quote order is filled in Leg A, the automated trading will re-compute the quote prices for each spread. If Leg B and C both result in the same quote order price in Leg A, the offsetting hedge order will be submitted to Leg B instead of Leg C, based on Leg B having a higher defined precedence level than Leg C.

At step 506, the automated trading tool computes the quote price for each individual spread. The automated trading tool uses the desired spread price and the best leaned on price for Leg B, C, or D to compute the quote price to be used in the shared leg. Specifically, the trader inputs a desired price to buy the spread, where the desired spread price for each individual spread can be the same or a trader may choose one overall desired spread price. The automated trading tool will place a buy order in the shared Leg A, based on the desired spread price and the best price that a sell order could be filled at in Leg B, C, or D, or the leaned on price.

To compute the quote price when buying the spread the following calculation is used:

Spread price+Best Leaned on Price in Leg B, C, or D=Quote Price in Leg

At step 508, the automated trading tool determines which individual spread results in the quote price closest to the inside market in the shared leg.

At step 510, the automated trading tool places a quote order at the price closest to the inside market in the shared leg based on the determination in step 506. The automated trading tool associates the quote order in the shared leg with the individual spread leg that resulted in the quote price closest to the inside market. When a condition is detected, such as a market fluctuation, time expiration, or the quote order getting filled, the leg that the quote order is associated with may change.

At step 512, the automated trading tool determines if a condition has been detected. For example, a condition may be the quote order getting filled, a market fluctuation, or time expiration.

At step 514, if the automated trading tool determines that a condition was not detected, then the original leg associated with the quote order remains associated with the quote order and the automated trading tool waits until a condition is detected to re-compute the quote prices for each spread.

At step 516, the automated trading tool determines if the detected condition was a fill in the quote order quantity. Based on user-configuration, the fill detected could be a partial fill of the quantity, or possibly when the full quantity has been filled.

At step 518, the automated trading tool confirms that the detected condition is a fill and therefore, computes the offsetting hedge order price for each individual spread. The automated trading tool uses the same calculation as used in step 506 to determine the quote price associated with each spread.

At step 520, the automated trading tool determines which individual spread results in the best offsetting hedge order price. The automated trading tool associates the hedge order with the offsetting hedge order price that results in the most advantageous spread price.

At step 522, the automated trading tool sends the offsetting hedge order to the leg associated with most advantageous spread price. In the instance that more than one leg results in the most advantageous spread price, the automated trading tool will utilize the defined precedence levels to determine to which leg the offsetting hedge order will be sent.

The offsetting hedge order may be a market order or a limit order. Preferably, the hedge order is sent to a price that is calculated based on the fill price of the quote order. Based on market the conditions in each spread leg and the desired spread price for each strategy, the automated trading tool determines the most advantageous offsetting hedge price associated with each spread leg. The automated trading tool then places a limit order at the offsetting hedge price in the appropriate spread leg. Alternatively, the offsetting hedge order could be a limit order based on the leaned on price in the leg on which the quote order leaned on when the quote order filled. In another alternative, the offsetting hedge order could be a market order sent to the leg in which quote order leaned on. Furthermore, pay-up ticks can be used to close the price gap between limit orders and the inside market. A detailed description of pay-up ticks is disclosed in U.S. patent application Ser. No. 11/240,684, entitled "System and Method for Use of Fractional Pay-up Ticks in Relation to Trading Strategies in an Electronic Trading Environment, filed on Sep. 30, 2005, the contents of which are incorporated herein by reference.

At step 524, the automated trading tool has determined that the detected condition was not a fill, but instead was some other defined condition, such as a market fluctuation or time expiration. The automated trading tool re-computes the quote price for each individual spread. The automated trading tool uses the same calculation as used in step 506 to determine the quote price associated with each spread.

At step 526, the automated trading tool determines which individual spread results in the quote price closest to the inside market in the shared leg. It is possible that the quote order closest to the inside market may be at a different price level than previously determined. In this instance, that automated trading tool would cancel the existing quote order and replace it with another quote order and the updated quote price level. The automated trading tool associates the quote order with the leg/leaned on price that results in the quote price closest to the inside market.

In an alternative embodiment, the automated trading tool may send the offsetting hedge order to the leg initially associated with the quote order. In this embodiment, the automated trading tool would skip steps 518 and 520, where the quote order prices are re-computed and re-associated when a condition is detected.

In another alternative embodiment, it is possible to quote more than one single order, but fewer than the number of possible spreads. For instance, two orders could be quoted out of a possible three or more spreads. In instances such as this, the second or additional quote orders could be at price levels that are the next best to the first quote order.

VI. Example of Reducing the Risk Involved in Trading Multiple Spreads with a Shared Leg

A. Determining a Quote Order Price

Figure 6:
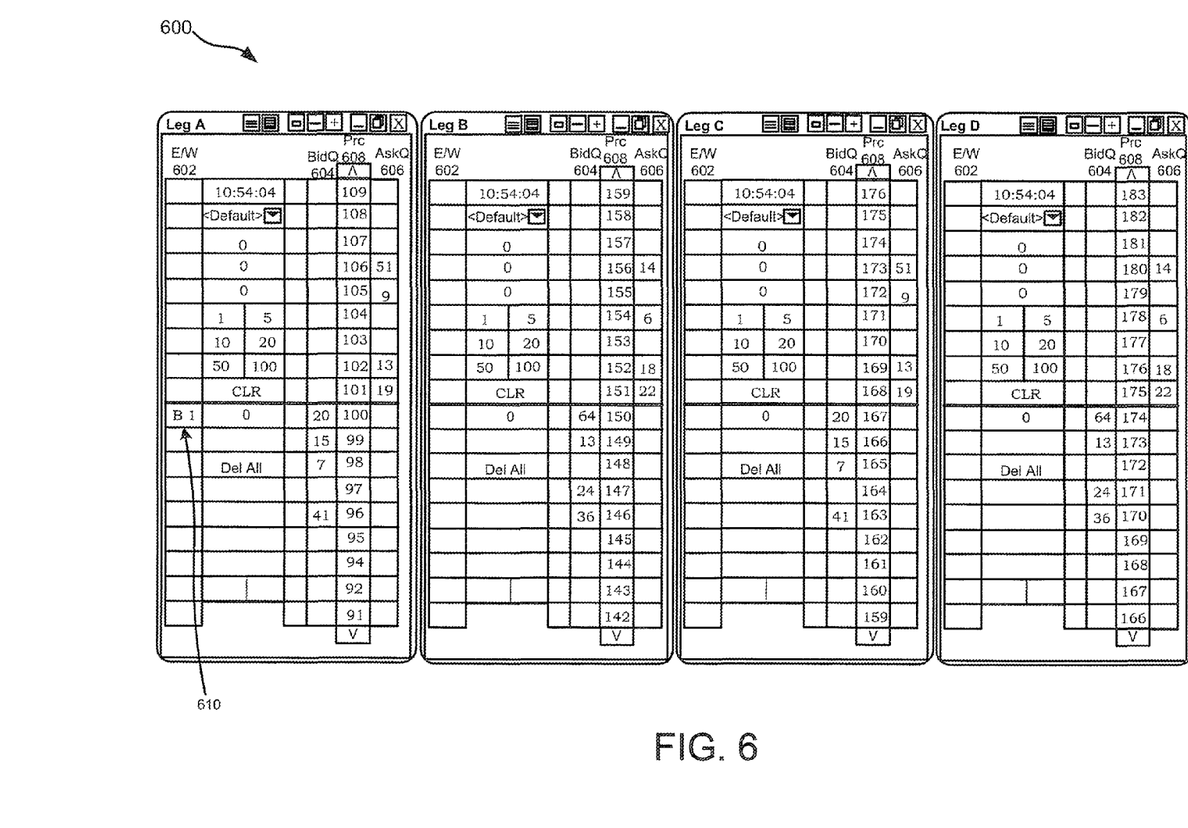
FIG. 6 is a block diagram illustrating a trading screen that demonstrates an example method for reducing the risk associated with trading a spread trading strategy in an electronic trading environment.

FIG. 6 is a block diagram illustrating trading screens associated with the multiple legs of an example spread trading strategy. Specifically, FIG. 6 includes the trading screens 600 associated with the multiple legs A, B, C, and D of the spread. The trading screens display a working quantity column 602, bid quantity column 604, ask quantity column 606, price column 608, and the working quote order 610. The working quantity column 602 displays desired orders to buy or sell quantity of that tradeable object. The bid quantity column 604 displays buy order quantities available in relation to certain price levels in price column 608. The ask quantity column 606 displays offer order quantities available in relation to certain price levels in price column 608. The price column 608 displays the price levels associated with the multiple legs involved in the spread trading strategy. The working quote order 610 displays an order that was entered by the automated trading tool based on the trader's desired spread price and the best leaned on prices in Legs B, C, and D.

According to the example embodiments, the trader selects a desired spread price for each individual spread. Based on the desired spread price and the best leaned on price in each leg, the automated trading tool will compute the quote prices for each spread. The trading tool will then determine which quote price is closest to the inside market in the shared Leg A.

Alternatively, a trader may choose one overall desired spread price instead of a spread price for each individual spread. This would be most useful in the instance that the trader is spreading multiple tradeable objects that are in the form of yields.

Based on the computed quote prices, the automated trading tool enters the working quote order 610 at a price level of "100". In this example, the computed spread price between spread Leg A/B resulted in the quote price closest to the inside market in the shared Leg A.

TABLE 1

|  | Spread Price | + Leaned on Price | = Quote Price in Shared Leg |
|---|---|---|---|
| Leg A/B | −50 | 150 (B) | 100 |
| Leg A/C | −68 | 167 (C) | 99 |
| Leg A/D | −74 | 174 (D) | 100 |
|  |  | Best Quote Price | = 100 = SP (AB) |

Table 1 illustrates the prices the automated trading tool uses to compute the quote price in Leg A. The automated trading tool uses the desired spread price and the best leaned on price of the other spread legs (B, C, and D) to calculate the possible quote prices for Leg A. The spread price for Leg A/B results in a quote price of "100" in Leg A based on the following calculation (spread price+best leaned on price in second leg=quote price); the spread price for Leg A/C results in a quote price of "99" in Leg A; and the spread price for Leg A/D also results in a quote price of "100" in Leg A.

As shown in Table 1, Legs A/B and A/D result in the same quote price of "100." As previously described, a trader may define precedence levels after configuring the individual spread legs. One of the legs is defined to have the highest precedence level over the other legs. The leg defined to have the highest precedence level will be associated with the quote order when two or more legs result in a quote order closest to the inside market in the shared leg. This is necessary so that the automated trading tool knows which leg to send the offsetting hedge order to when the quote order fills in Leg A. Although both spreads A/B or A/D result in the quote price closest to the inside market, "100", Leg B is associated with the quote order in Leg A because the trader defined Leg B to have the highest precedence level. As a result, the working quote order 610 is placed in Leg A and associated with Leg B. If the working quote order 610 were to fill at this time, and the market did not change, the automated trading tool would re-compute the quote prices and send an offsetting hedge order to Leg B.

B. Detecting a Condition and Adjusting the Quote Order

FIG. 7 is a block diagram illustrating the same trading screens as displayed in FIG. 6 at a later time. FIG. 7 specifically displays the working quote order 710 at the same price level as in FIG. 6, however the working quote order 710 is now associated with spread Leg D.

According to the example embodiments, if a condition is detected, such as a market fluctuation or a quote order getting filled, the automated trading tool re-computes the quote prices for the shared Leg A to determine if the leg associated with the working quote order 710 still results in the quote price closest to the inside market.

TABLE 2

|  | Spread Price | + Leaned on Price | = Quote Price in Shared Leg A |
|---|---|---|---|
| Leg A/B | −50 | 149 (B) | 99 |
| Leg A/C | −68 | 167 (C) | 99 |
| Leg A/D | −74 | 174 (D) | 100 |
|  |  | Best Quote Price | = 100 = SP (AD) |

Table 2 illustrates the prices the automated trading tool uses to re-compute the quote price in Leg A once a condition has been detected, in this instance the condition is a market fluctuation. As shown in FIG. 7, the inside market in Leg B fluctuated down one tick, such that the best bid is now the price level of "149" and the best ask is at "150". The spread price for Leg A/B now results in a quote price of "99" in Leg A; the spread price for Leg A/C also results in a quote price of "99" in Leg A; and the spread price for Leg A/D results in a quote price of "100" in Leg A.

FIG. 7 illustrates that the inside market in Leg A is still at a best bid price of "100" and a best ask price of "101." The spread between Leg A/D now results in the quote order price closest to the inside market in Leg A, "100." The working quote order 710 is associated with Leg D instead of Leg B since the quote price resulting from the spread A/B is a price of "99." Associating the working quote order 710 with Leg D. If the working quote order 710 were to fill at this time, and the markets did not change, the automated trading tool would send an offsetting hedge order to Leg D.

Figure 8:
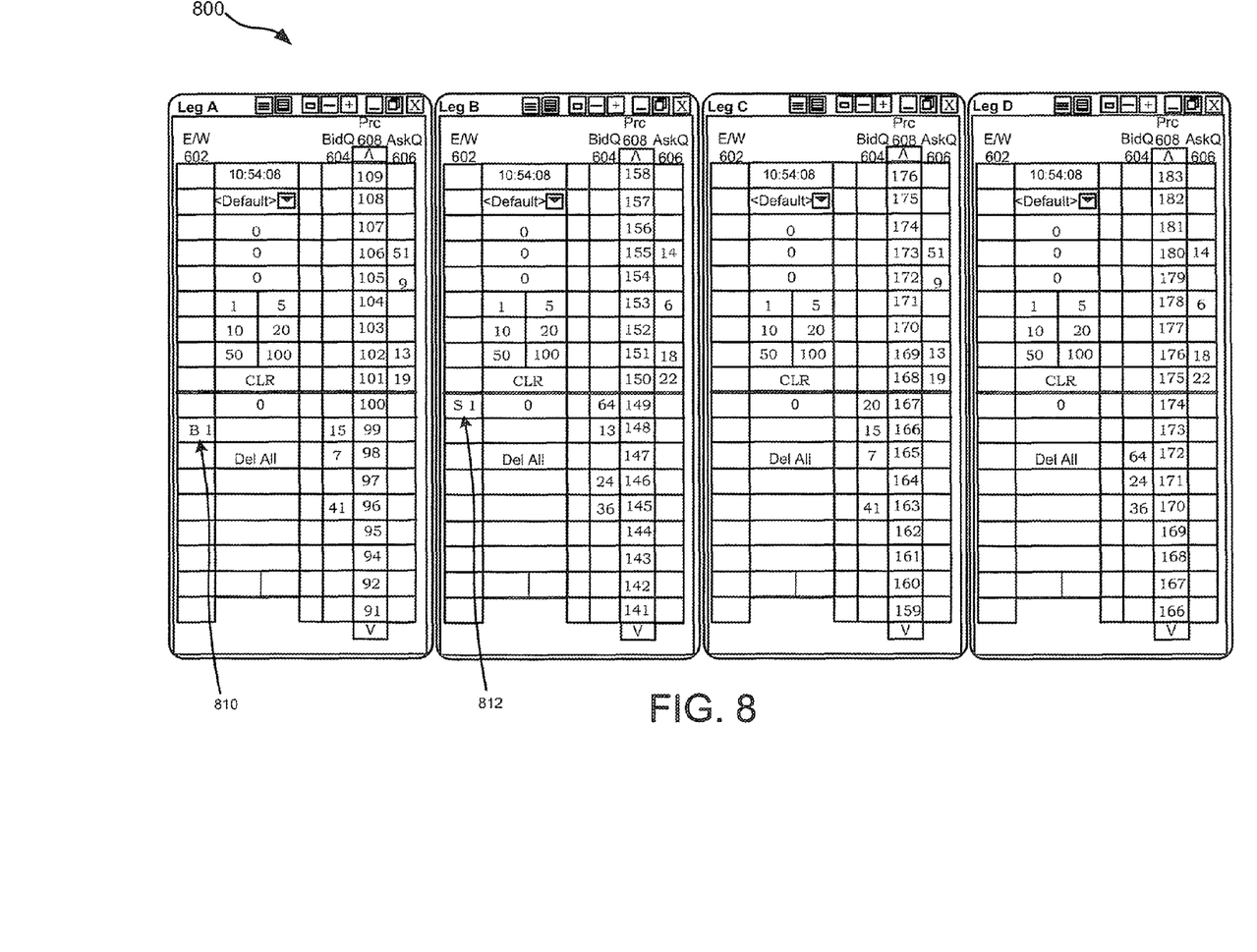
FIG. 8 is a block diagram illustrating a trading screen that demonstrates an example method for placing a hedge order in the leg involved in the spread.

C. Adjusting the Quote Order and Placing an Offsetting Hedge Order in the Leg with Precedence FIG. 8 is a block diagram illustrating the same trading screens as displayed in FIG. 6 and FIG. 7, but at a later time. FIG. 8 specifically displays the working quote order 810 at a different price level than displayed in FIG. 7. The working quote order 810 is now associated with spread Leg B, which after being re-computed by the automated trading tool, resulted in a different quote price level in Leg A. FIG. 8 also displays the offsetting hedge order that would be sent to the leg associated with working order 810 if working order 810 were filled at this time. The offsetting hedge order 812 is submitted to Leg B once working order 810 is filled.

According to the example embodiments, the automated trading tool continually determines if a condition has been detected. If the detected condition is a market fluctuation, the automated trading tool re-computes the quote price for the shared Leg A to determine if the leg associated with the working quote order 810 still results in the quote price closest to the inside market. Alternatively, if the detected condition is the quote order getting filled, As described, because the trader is more concerned with achieving the best quote price, the automated trading tool would also re-compute the quote prices to determine which is closest to the inside market in the shared leg. Once determined, the automated trading tool would send an offsetting hedge order to that leg. As shown in FIG. 8, working order 810 was initially associated with Leg B, but was then re-associated with Leg D when Leg D resulted in the quote order price closer to the inside market in the shared Leg A.

TABLE 3

|  | Spread Price | + Leaned on Price | = Quote Price in Shared Leg A |
|---|---|---|---|
| Leg A/B | −50 | 149 (B) | 99 |
| Leg A/C | −68 | 167 (C) | 99 |
| Leg A/D | −74 | 172 (D) | 98 |
|  |  | Best Quote Price | = 99 = SP (AB) |

Table 3 illustrates the prices the automated trading tool uses to re-compute the quote price in Leg A once the markets in the legs have fluctuated. Specifically, table 3 shows that the Leg D market fluctuated and due to that market fluctuation, Leg B now results in a closer quote price to the inside market. As shown in FIG. 8, the inside market in Leg D fluctuated down "2" ticks from "174", such that that best bid is now at a price level of "172" and the best ask is at a price level of "175". Table 3 shows that the spread price for Leg A/B now results in a quote price of "99" in Leg A; the spread price for Leg A/C also results in a quote price of "99" in Leg A; and the spread price for Leg A/D results in a quote price of "98" in Leg A.

FIG. 8 illustrates that the inside market in Leg A has a best bid price of "100" and a best ask price of "101." However, based on the market fluctuations in Leg B, C, D, the computed quote price closest to the inside market in Leg A, is now at a price level of "99". The working quote order 810 must be re-priced to a price level of "99" from the price level of "100" shown in FIGS. 6 and 7. The spread between Leg A/B results in the quote price closest to the inside market in Leg A, thus the working quote order 810 must be re-associated with Leg B. If the working quote order 810 were to fill at this time, and the market did not change, the automated trading tool would re-compute the quote prices and send an offsetting hedge order to Leg B.

As shown in FIG. 8, a hedge order 812 has been placed in Leg B to illustrate where an offsetting hedge order would be placed if working quote order 810 had been filled in Leg A. Offsetting hedge order 812, a sell order, is placed at the best bid/leaned on price level of "149" in Leg B, such that the hedge order 812 has a very high likelihood of getting filled, and reducing the chances of a trader getting "legged up".

CONCLUSION

The example embodiments discussed above describe a method for reducing the risks involved in trading multiple spread trading strategies in an electronic trading environment. Specifically, the embodiments reduce the risks involved in trading multiple spreads that share a leg by, among other things, quoting a single order in the shared leg instead of quoting orders for each of the corresponding spread legs. The embodiments manage the single order based on the market conditions in the spread legs. Once the single order fills, a hedge order is sent to the leg that obtains the most advantageous price for the spread based on the other spread options. The embodiments can be put to advantageous use in situations where a trader is interested in buying or selling a certain tradeable object (e.g., most often the shared leg), and is willing to hedge the order into any one of several tradeable objects. As such, the embodiments allow a trader to trade the tradeable object for which there is particular interest while hedging the risk into multiple markets at the general cost of hedging the risk into one market.

According to a conventional automated trading tool, working multiple spreads that share a leg would equate to placing multiple orders in the quoting or shared leg, where each order is associated with one of the multiple spreads. According to the example embodiments, the automated trading tool computes the quote price for each of the multiple spreads and determines which computed quote price is closest to the inside market, or any other price level such as the last trade price, in the shared leg. Of the multiple quote prices, the automated trading tool then quotes a single order at that computed quote price in the shared leg, thus allowing the trader to offset into multiple markets while only paying to cost for one market. The single order quoted in the shared leg coincides with the computed spread price that results in the price closest to the inside market in the shared leg, where the trader is not concerned with which leg produces the best quote price, but that the trader is able to buy or sell the shared leg for the best possible price.

Additionally, as the markets in the individual spread legs fluctuate, the automated trading tool may compute a better quote price for the desired spread. This allows the automated trading tool to always use the computed quote price that results in a quote order that is closest to the inside market in the shared leg.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for reducing the risks involved in trading multiple spread trading strategies may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method comprising:
defining a plurality of spread trading strategies, each of the plurality of spread trading strategies comprising at least a request to trade a first tradeable object and a request to trade a second tradeable object, wherein the first tradeable object of each of the plurality of spread trading strategies is a common tradeable object, and the second tradeable object of each of the plurality of spread trading strategies is different from the common tradeable object, and the second tradeable object is different in each of the plurality of spread trading strategies;
calculating by a computer device a quote price for the common tradeable object for each of the plurality of spread trading strategies based on a desired price to buy or sell each of the plurality of spread trading strategies;
from the calculated quote prices for the common tradeable object of the plurality of trading strategies, selecting by the computer device a first quote price closest to a price level based on either an inside market price or a last traded price of the common tradeable object; and
sending by the computer device a first quote order for the common tradeable object at the selected first quote price.

2. The method of claim 1, further comprising:
detecting a condition;
in response to detecting the condition:
calculating a quote price for the common tradeable object for each of the plurality of spread trading strategies;
from the quote prices for the common tradeable object calculated after detecting the condition, selecting a second quote price closest to the price level based on either the inside market price or the last traded price of the common tradeable object; and
re-pricing the first quote order to the second quote price.

3. The method of claim 2, wherein the condition comprises a user-defined condition.

4. The method of claim 2, wherein the condition comprises a market fluctuation in the second tradeable object corresponding to a spread trading strategy associated with the first quote price selected prior to detecting the condition.

5. The method of claim 2, wherein the condition comprises a time expiration.

6. The method of claim 2, wherein the condition comprises detecting a fill of at least a portion of a total order quantity for the first order.

7. The method of claim 6, wherein the at least a portion of the total order quantity to be filled is user-defined.

8. The method of claim 6, wherein the at least a portion of the total order quantity to be filled comprises a percentage of the total order quantity.

9. The method of claim 6, wherein the at least a portion of the total order quantity to be filled comprises a value.

10. The method of claim 1, further comprising:
detecting a fill of a total order quantity of the first quote order; and
placing an offsetting hedge order for the second tradeable object in one of the plurality of spread trading strategies.

11. The method of claim 10, wherein the offsetting hedge order comprises a market order.

12. The method of claim 10, wherein the offsetting hedge order comprises a limit order.

13. The method of claim 12, wherein the limit order is placed at a price level based on a leaned on price for each tradeable object that is not the common tradeable object and that corresponds to each hedge leg of one of the plurality of spread trading strategies that results in the first quote price closest to the price level, wherein the leaned on price is used to determine the first quote price.

14. The method of claim 12, wherein the limit order is placed at a price level that is calculated based on a fill price of the first order and the desired price for one of the plurality of spread trading strategies.

15. The method of claim 1, wherein the price level is user-defined.

16. The method of claim 1, wherein the inside market price comprises a highest bid price and a lowest ask price currently available in a market.

17. The method of claim 1, further comprising:
defining a precedence level for each of the plurality of spread trading strategies;
selecting one of the plurality of spread trading strategies based on the precedence level for each of the plurality of spread trading strategies; and
sending an offsetting hedge order for the second tradeable object of the selected spread trading strategy.

18. The method of claim 17, wherein the precedence level is user-defined.

19. The method of claim 17, wherein the precedence level is based on trading volume in at least one of the first tradeable object and second tradeable object associated with each of the plurality of spread trading strategies.

20. The method of claim 17, wherein the precedence level is based on trading activity in at least one of the first tradeable object and the second tradeable object associated with each of the plurality of spread trading strategies.

21. The method of claim 1, further comprising:
determining that two or more calculated quote prices result in the same price closest to the price level;
selecting a spread trading strategy having a highest precedence level from two or more spread trading strategies associated with the two or more calculated quote prices closest to the price level; and
sending a hedge order for the second tradeable object of the selected spread trading strategy having the highest precedence level.

22. The method of claim 1, wherein the quote price for the common tradeable object of each of the plurality of spread trading strategies is determined using the desired price and a leaned on price for each second tradeable object that corresponds to each hedge leg of each of the plurality of spread trading strategies.

23. The method of claim 1, wherein the desired price to buy or sell each of the plurality of spread trading strategies is different.

24. The method of claim 1, wherein the desired price to buy or sell each of the plurality of spread trading strategies is the same.

* * * * *

UNITED STATES PATENT AND TRADEMARK OFFICE
CERTIFICATE OF CORRECTION

| | | |
|---|---|---|
| PATENT NO. | : 8,583,536 B1 | Page 1 of 1 |
| APPLICATION NO. | : 11/840553 | |
| DATED | : November 12, 2013 | |
| INVENTOR(S) | : Deitz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this
Third Day of March, 2015

Michelle K. Lee
*Deputy Director of the United States Patent and Trademark Office*